(No Model.)

W. A. FORMAN.
WHEEL.

No. 375,058. Patented Dec. 20, 1887.

WITNESSES
Alfred Joughmans
William Partington

INVENTOR
W. A. Forman
by his attorneys
Roeder & Briesen ns.# UNITED STATES PATENT OFFICE.

WILLIAM A. FORMAN, OF ROSELLE, NEW JERSEY.

WHEEL.

SPECIFICATION forming part of Letters Patent No. 375,058, dated December 20, 1887.

Application filed September 17, 1887. Serial No. 249,916. (No model.)

*To all whom it may concern:*

Be it known that I, WILLIAM A. FORMAN, of Roselle, Union county, New Jersey, have invented a new and Improved Wheel, of which the following is a specification.

This invention relates to a wheel for wagons and other vehicles, which is so constructed that the load supported upon the axle will aid in revolving the wheel when the latter encounters stones or other obstacles.

The invention consists in the various features of construction, more fully pointed out in the claims.

Figure 2:
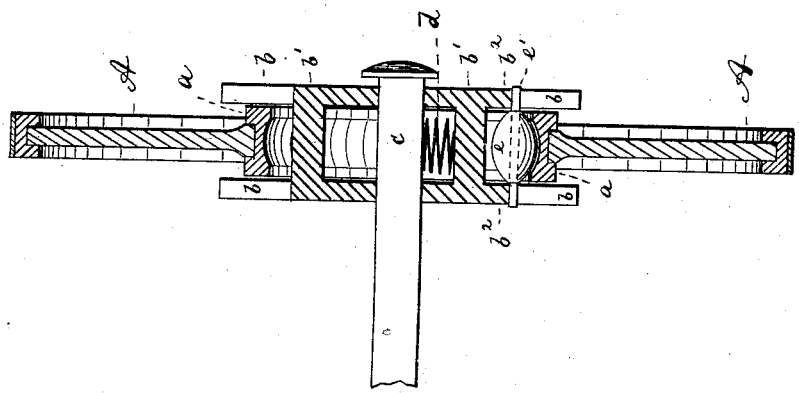
Figure 1:
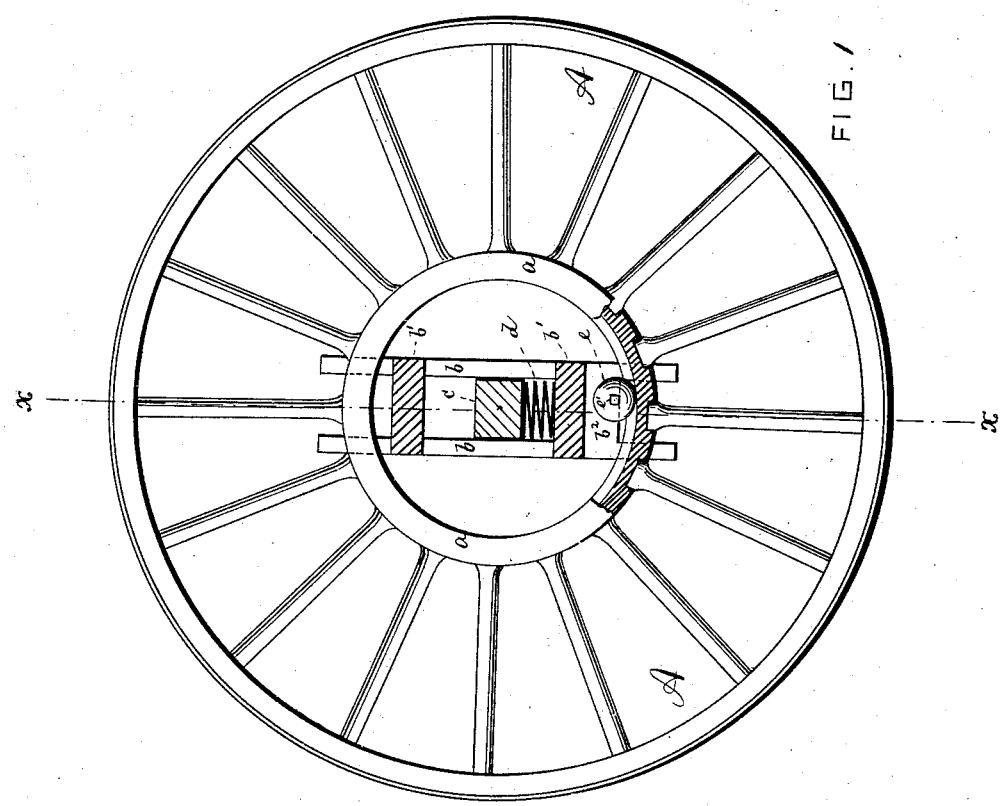

In the accompanying drawings, Figure 1 is a sectional side view of my improved wheel. Fig. 2 is a cross-section on line $x$ $x$, Fig. 1.

The letter A represents a wheel having the hub $a$. At each side of the hub there are placed two bars, $b$, connected by the cross-pieces $b'$, the whole constituting one solid vertically-movable block. The upper and lower ends of the bars $b$ project beyond the circumference of the hub $a$, and thus hold the block in place. The squared axle $c$ of the vehicle is introduced between the bars, $b$, and is of a size to fit snugly between the bars, thus preventing them from revolving when the vehicle is propelled. The axle $c$ rests upon a coiled spring, $d$, the lower end of which is supported by the lowermost cross-piece, $b'$. This cross-piece is grooved or cut away centrally at its lower face, so as to form a pair of bearings, $b^2$, for the axle $e'$ of a small, preferably flattened, roller, $e$. The inner periphery of the hub $a$ is grooved, Fig. 2, so as to form a proper channel in which the roller $e$ may travel. The roller $e$ should be hung a short distance in front of the center line of the wheel and hub to exercise a pressure upon the hub slightly forward of its lowermost point.

In use the axle $c$ compresses the spring $d$, and the latter forces the vertically-movable block and the roller $e$ down. As the vehicle is propelled, the wheel A turns, and as the block within the hub does not turn the roller $e$ will rapidly travel along the inner grooved surface of the hub $a$. As soon as a stone or unevenness is encountered, the axle $c$ will fly up slightly to permit partial expansion of the spring $d$. Upon the next downward motion of the axle the spring will be quickly compressed to force the roller $e$ upon the surface of hub $a$ in front of its lowermost point. Thus the roller will aid to revolve the wheel and to carry it over the obstacle.

What I claim is—

1. The combination of wheel A, having hub $a$, with a block which is vertically movable within the hub, and with a roller pivoted to such block and bearing upon the inner surface of the hub, substantially as and for the purpose specified.

2. The combination of wheel A, having hub $a$, with the bars $b$ $b$, projecting beyond the circumference of the hub, and with the cross-pieces $b'$, roller $e$, spring $d$, and squared axle $c$, substantially as and for the purpose described.

3. The combination of wheel A, having hub $a$, with the bars $b$ $b$, cross-pieces $b'$, axle $c$, spring $d$, and flattened roller $e$, the inner periphery of the hub being grooved to accommodate said roller, substantially as specified.

4. The combination of a wheel with a vertically-movable block within the same, and with a squared axle that prevents the rotation of the block, and with a roller pivoted to the block in front of the center line of the wheel, substantially as specified.

WILLIAM A. FORMAN.

Witnesses:
F. V. BRIESEN,
WILLIAM PARTINGTON.